W. FARMER.
Dumping Cart.
No. 87,831. Patented March 16, 1869.
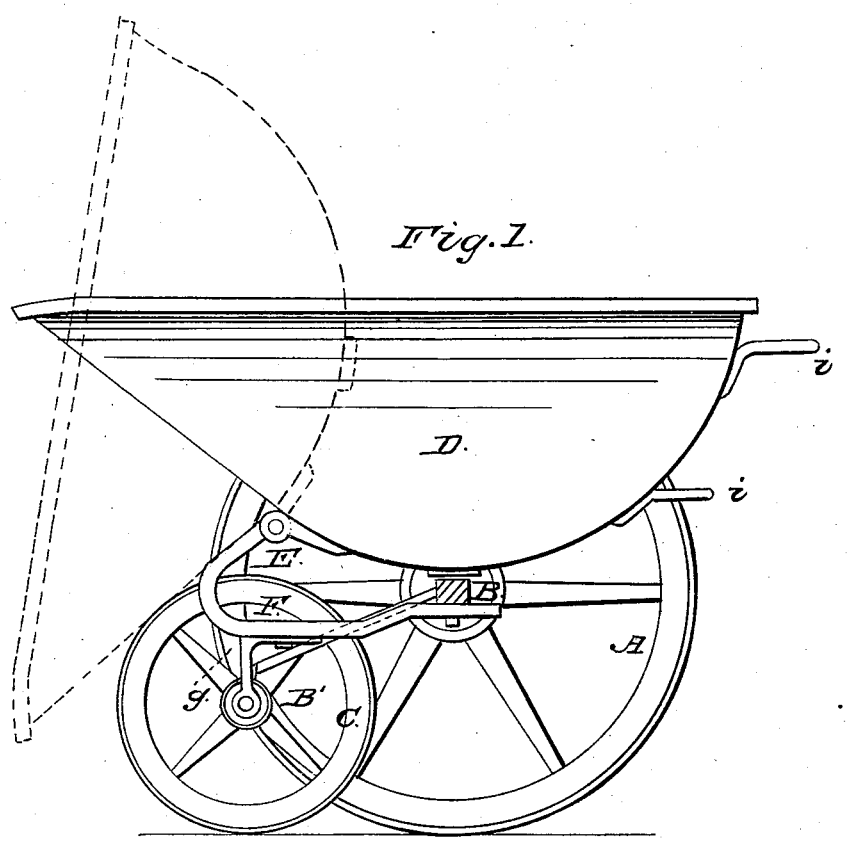
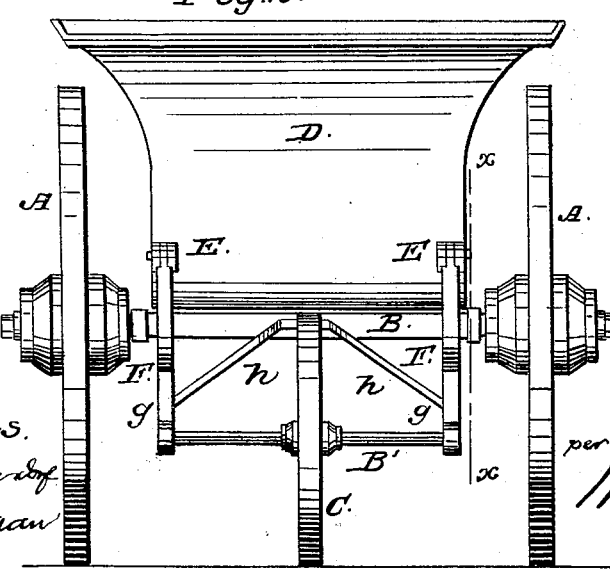

United States Patent Office.

WILLIAM FARMER, OF NEW YORK, N. Y.

Letters Patent No. 87,831, dated March 16, 1869.

IMPROVED HAND-DUMPING CART.

The Schedule referred to in these Letters Patent and making part of the same.

*To all whom it may concern:*

Be it known that I, WILLIAM FARMER, of New York, in the county of New York, and State of New York, have invented a new and useful Improvement in Hand-Dumping Carts; and I do hereby declare that the following is a full, clear, and exact description thereof, which will enable others skilled in the art to make and use the same, reference being had to the accompanying drawing, forming part of this specification.

This invention relates to a new and improved wheeled-vehicle for moving various commodities or articles, and consists in the novel construction and arrangement of parts, as hereinafter more fully described.

Figure 1 represents a sectional side elevation of the cart, showing the body as when dumped, in red color, the section being through the line x x of fig. 2.

Figure 2 is a front elevation.

Similar letters of reference indicate corresponding parts.

This cart is composed of two main wheels A A, which revolve on the axle B; a small central wheel, C, which revolves on its own axle, B'; and the body D, which rests mainly on the top of the axle B, but partly on the hinges E E, which are formed on the bows F F and body, as seen in fig. 1.

These bows are rigidly attached to the axle B and to the front part of the body, as seen in the drawing, so that by raising the back end, the body is easily dumped or thrown into the position seen in red color, when the contents slide out by their own gravity. The body is curved, as seen, so as to facilitate the operation.

The axle of the third wheel C is supported by hangers g, extending down from the bows F, which are supported from the axle B by the stay-rods h h.

When the body of the cart is in a horizontal position, or loaded, the wheel C bears upon the ground, as seen in the drawing, and revolves with the other wheels, but its principal use is as a stand to support the body in a horizontal position when in a state of rest.

This cart is propelled by hand, and operated from behind, by means of the handles i i.

It is much more convenient than the ordinary barrow, and is especially adapted for use in gas-houses, for conveying lime to and from the purifying-boxes, and coke from the retorts, and is useful for all purposes for which hand-conveyances are employed.

Having thus described my invention,

I claim as new, and desire to secure by Letters Patent—

1. The combination of the hinged bows F F and wheel C, with the wheels A and body D, substantially as described, for the purpose specified.

2. A three-wheeled cart, having its body hinged in front of the axle, in such a manner as to adapt it for dumping its contents in front of the central wheel, substantially as herein shown and described.

The above specification of my invention signed by me, this 21st day of November, 1868.

WM. FARMER.

Witnesses:
FRANK BLOCKLEY,
ALEX. F. ROBERTS.